Figure 1:
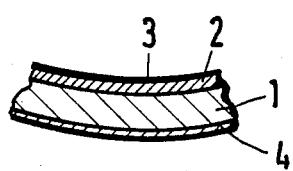

United States Patent [19]

Bickle et al.

[11] Patent Number: 4,666,792
[45] Date of Patent: May 19, 1987

[54] MATERIAL FOR USE IN THE MANUFACTURE OF COMPOSITE BEARINGS FOR CRANKSHAFTS

[75] Inventors: Wolfgang Bickle, Reilingen; Harald Pfestorf, Untereisesheim, both of Fed. Rep. of Germany

[73] Assignee: Kolbenschmidt Aktiengesellschaft, Neckarsulm, Fed. Rep. of Germany

[21] Appl. No.: 755,039

[22] Filed: Jul. 15, 1985

[30] Foreign Application Priority Data

Jul. 14, 1984 [DE] Fed. Rep. of Germany ....... 3425960

[51] Int. Cl.$^4$ ............................................. B32B 75/08
[52] U.S. Cl. ..................................... 428/626; 384/913
[58] Field of Search ............... 428/626, 545, 564, 632; 252/12; 308/DIG. 8, DIG. 9, DIG. 7

[56] References Cited

U.S. PATENT DOCUMENTS

| | | | |
|---|---|---|---|
| 3,114,708 | 12/1963 | Morway et al. | 252/12 |
| 3,464,845 | 9/1969 | Osborn et al. | 428/545 |
| 4,086,376 | 4/1978 | Davies | 252/12 |
| 4,308,153 | 12/1981 | Mori | 428/626 |
| 4,357,249 | 11/1982 | Mellor | 252/12 |
| 4,371,445 | 2/1983 | Faigle | 252/12 |

FOREIGN PATENT DOCUMENTS 0003856 9/1979 European Pat. Off. ............ 428/626

Primary Examiner—L. Dewayne Rutledge
Assistant Examiner—S. Kastler
Attorney, Agent, or Firm—Sprung Horn Kramer & Woods

[57] ABSTRACT

A composite bearing material for use in the manufacture of crankshaft bearings comprises a steel strip, which is provided on one side, which is to be used disposed on the outside of the bearing, with an elastic layer, and on the other side, which is to be disposed on the inside of the bearing, with a bearing metal layer. In order to effect a sound insulation, in a particularly desirable manner the elastic layer consists of halogen-free polymers.

13 Claims, 2 Drawing Figures

MATERIAL FOR USE IN THE MANUFACTURE OF COMPOSITE BEARINGS FOR CRANKSHAFTS

This invention relates to a material for use in the manufacture of composite bearings for crankshafts, comprising a backing consisting of steel, cast iron, bronze, high-strength aluminum alloys or the like and provided on one side, which is to be disposed on the outside of the bearing, with an elastic layer having a thickness of 0.05 to 0.5 mm, preferably 0.08 to 0.2 mm, and provided on the other side, which is to be disposed on the inside of the bearing, with a bearing metal layer and optionally with a wearing layer on said bearing metal layer.

It is known that crankshaft bearings which constitute a link of the chain consisting of the piston, piston pins, connecting rod, crankshaft and crankcase, contribute decisively to the sound which is emitted by the internal combustion engine or compressor. That is particularly true for those internal combustion engines, compressors and vehicles which are light-weight structures and/or designed for an optimum combustion in order to save fuel. By experience, lighter structures are louder than heavy ones, and hard, loud combustion processer are more economical. The reduction of noise is getting more and more important in recent times. This is due to more stringent regulations regarding the protection of the environment and to the use of lightweight structures and higher comfort requirements. For this reason it is desired to acoustically decouple the crankshafts from the crankcase as perfectly as possible. For instance, it is taught in Published German Application No. 32 16 318 that those elements which are directly excited by structure-born sound, such as cylinders, cylinder head, pistons, connection rods, crankshaft bearings and crankshafts, should be mounted in an power train carrier, which is elastically connected to the crankcase. Owing to the high structural expenditure involved in such a design, it is not suitable for internal combustion engines of vehicles. British Patent Specification No. 1,137,693 contains the proposal to mount the crankshaft bearings in the crankcase by means of vibration dampers consisting of elastic bushings in order to reduce the transmission of structure-born sound from the crankshaft to the crankcase. German Utility Model No. 83 09 053 describes a crankshaft bearing in which an elastic film consisting of a heat-resisting plastic material, such as polytetrafluoroethylene or polyamide, is provided between the bearing and the crankcase. Finally, Published German Application No. 30 17 847 teaches a crankshaft bearing in which a vibration damping material is provided between an outer bearing shell and an inner bearing shell. That structure is relatively complicated and requires a large space.

For this reason it is an object of the present invention to provide a composite bearing material which is of the kind described first hereinbefore and which in consideration of the operating conditions and of the special requirements to be met by crankshaft bearings is so constituted that the crankshaft bearings made from said material will effect a sound insulation but will not adversely affect in any way the function of the bearing for crankshafts.

This object is accomplished in that the metallic backing of the composite bearing material is coated on said one side with a layer of halogen-free polymers.

Polyetheretherketone (PEEK) and polyethersulfone (PES) have been found to be polymers which are particularly suitable for that purpose and may be used individually or in a mixture with one another. Said plastic materials distinguish by a high dimensional stability and resistance to chemical attack at elevated temperatures.

The bond strength between the metallic backing and the polymer layer will not be adversely affected if the polymers employed contain up to 50 weight percent, preferably 5 to 35 weight percent, pulverulent or fibrous fillers, such as glass fibers, glass beads and/or carbon fibers.

It has been found that the strength of the bond between the metallic backing and the polymer layer of the composite bearing material will generally meet the requirements if the backing has been provided with a rough surface by grinding, brushing or sandblasting.

For higher loads, the metallic backing of the composite bearing material is suitably provided on said one side with a rough surface formed by a sintered or sprayed porous layer of bronze, aluminum, nickel or the like in a thickness of 0.1 to 0.5 mm.

In a particularly desirable embodiment the rough surface is formed by an aluminum or aluminum alloy layer which has been applied by cladding to the metallic backing of the composite bearing material and has a mechanically roughened surface.

In order to insulate sound as perfectly as possible, the composite bearing material comprises a steel backing in a thickness of 1 to 10 mm, a bearing metal layer (2) consisting of a lead-tin-copper alloy, preferably of CuPb22Sn, and provided on said other side of the backing in a thickness of 0.4 to 1.5 mm, and a bearing layer (3) consisting of a lead-tin copper alloy having a thickness of 0.02 to 0.025 mm and electrodeposited on said bearing metal layer. The steel backing is coated on said one side with a PES layer in a thickness of 0.05 to 0.5 mm.

In a particularly desirable embodiment the sound-insulating polymer layer is composed of 70 weight percent PES and 30 weight percent glass fibers.

In the manufacture of the proposed composite bearing material, a steel strip provided with a bearing metal layer is provided with a roughened surface on said one side and is heated to a temperature of 130° to 170° C., preferably by induction heating, and polymer dispersed in a solvent is subsequently applied to said roughened surface of the metal strip and is dried at a temperature of 350° to 400° C. The plastic layer is subsequenty smoothened by a rolling operation.

In a modification of that process the steel strip is provided on a non-roughened surface on said one side with a sintered or sprayed porous layer consisting of a metallic powder, and the plastic layer is then applied to said powder layer.

In a different process, the steel strip is provided by a cladding operation with a bearing metal strip on said other side and with an aluminum strip on said one side at the same time, a polymer powder is subsequently sprinkled onto the aluminum surface and is heated to a temperature of 350° to 380° C. so that the plastic layer is at a temperature in excess of 280° C. when it is subsequently compacted and sized.

Figure 2:
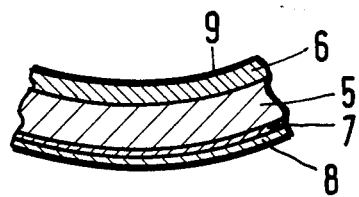

The invention will be further described with reference to the accompanying drawing wherein:

FIG. 1 is a section through a bearing formed of one embodiment of a composite material in accordance with the invention; and FIG. 2 is a section through another composite material in accordance with the invention.

FIG. 1 shows an illustrative embodiment of the composite bearing material in accordance with the invention. A steel strip 1 is provided on one side, which will be disposed on the inside of the bearing, with a sintered porous bearing metal layer 2 consisting of CuPb22Sn in a thickness of 0.3 mm. The roughened outside surface of the steel strip 1 is provided with a PES layer 4 in a thickness of 0.1 mm. The thin wearing or running-in layer 3 provided on the bearing metal layer 2 consists of an electrodeposited lead-tin-copper alloy.

FIG. 2 shows a composite bearing material comprising a steel strip 5, which has been provided on one side, which will be disposed on the inside of the bearing, by a cladding operation with a bearing metal layer 6 consisting of AlSn20 in a thickness of 0.5 mm, and on the other side by a cladding operation with an aluminum layer 7 in a thickness of 0.1 mm. A PES layer 8 in a thickness of 0.1 mm is provided on the aluminum layer 7. A thin wearing or running-in layer 9 consisting of a lead-tin-copper alloy is provided on the bearing metal layer 6.

The advantages afforded by the invention reside particularly in that the composite materials for use in crankshaft bearings, which materials have proved satisfactory for decades, are preserved, and the sound-insulating layer provided on the outside surface of the steel backing is an integral constituent part of the composite bearing so that very compact bearings can be made. Crankshaft bearing shells made from the material in accordance with the invention effect a distinct reduction of the sound emitted by an internal combustion engine.

It will be understood that the specification and examples are illustrative but not limitative of the present invention and that other embodiments within the spirit and scope of the invention will suggest themselves to those skilled in the art.

What is claimed is:

1. A cylindrical composite bearing for a crankshaft comprising a metallic backing of steel, cast iron, bronze or a high-strength aluminum alloy, an elastic halogen-free polymer layer having thickness of 0.05 to 0.5 mm provided on the outside of the bearing, and on the inside of the bearing, a bearing metal layer.

2. A bearing according to claim 1, wherein the polymer comprises polyetheretherketone (PEEK).

3. A bearing according to claim 1, wherein the polymer comprises polyethersulfone (PES).

4. A bearing according to claim 1, wherein the polymer comprises a mixture of PEEK and PES.

5. A bearing according to claim 1, wherein the polymer contains up to 50 weight percent of a pulverulent or fibrous filler.

6. A bearing according to claim 1, wherein the polymer contains 5 to 35 weight percent of at least one of glass fibers, glass beads and carbon fibers.

7. A bearing according to claim 1, wherein the metallic backing has on its outside a surface which has been mechanically roughened by grinding, brushing or sandblasting.

8. A bearing according to claim 1, wherein the metallic backing is provided on its outside with a rough surface formed by a sintered or sprayed porous metal powder layer of bronze, aluminum or nickel in a thickness of 0.1 to 0.5 mm.

9. A bearing according to claim 1, wherein the metallic backing is provided on its outside with an aluminum or aluminum alloy layer which has been applied by a cladding operation and has been mechanically roughened.

10. A bearing according to claim 1, comprising a steel backing in a thickess of 1 to 10 mm, a bearing metal layer comprising a lead-tin-copper alloy provided on its inside of the backing in a thickness of 0.4 to 1.5 mm, a bearing layer comprising a lead-tin-copper alloy having a thickness of 0.02 to 0.025 mm and electrodeposited on said bearing metal layer, and a PES layer in a thickness of 0.05 to 0.5 mm on said one side of the steel backing.

11. A bearing according to claim 10, wherein the PES contains about 30 weight % glass beads.

12. A bearing according to claim 1, including a wearing layer on the inside of the bearing metal layer.

13. In combination, a crankshaft in a composite bearing according to claim 1.

* * * * *